H. D. OAKLEY.
DEVICE FOR INDICATING MAGNETIC POLARITY.
APPLICATION FILED JULY 6, 1918.

1,328,187.

Patented Jan. 13, 1920.

Inventor
Henry D. Oakley
By Victor J. Evans
Attorney

Witnesses

UNITED STATES PATENT OFFICE.

HENRY D. OAKLEY, OF SYRACUSE, NEW YORK.

DEVICE FOR INDICATING MAGNETIC POLARITY.

1,328,187.     Specification of Letters Patent.     Patented Jan. 13, 1920.

Application filed July 6, 1918. Serial No. 243,538.

*To all whom it may concern:*

Be it known that I, HENRY D. OAKLEY, a citizen of the United States, residing at Syracuse, in the county of Onondaga and State of New York, have invented new and useful Improvements in Devices for Indicating Magnetic Polarity, of which the following is a specification.

This invention relates to devices for indicating magnetic polarity, and the object is to provide a device which may be used in tracing the magnetic circuits of electric motors and generators.

A further object is to provide a device which is easily carried by the workman in his pocket and is available at all times for use in ascertaining the polarity of magnets, or of the individual poles thereof, the device including a freely mounted bar magnet carried by a buoyant member and immersed in liquid within a glass tube suitably secured.

A still further object is to provide in a device of the type indicated a casing comprising a tubular member and a base portion, the base being provided with a bore in which a glass tube is mounted, said tube being sealed and inclosing a body of liquid and a bar magnet freely supported by means of a buoyant member.

With the foregoing and other objects in view, the invention consists in the novel construction, combination and arrangement of elements hereinafter described and claimed.

Figure 1:
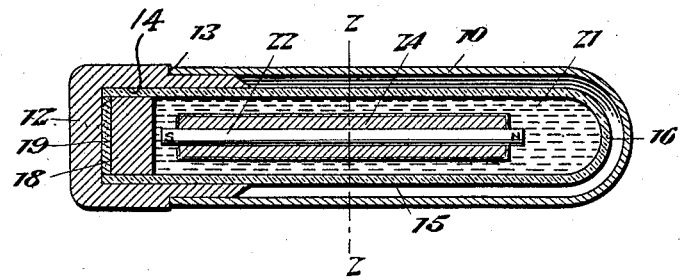
Figure 1 is a view of the device in longitudinal section.
Figure 2:
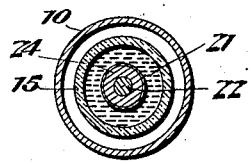
Fig. 2 is a section on line 2—2 of Fig. 1.

In carrying out my invention I provide a suitable metallic casing of tubular formation and designated 10, one end of the casing being closed by a base constituting a cap for the tubular member, said base being designated 12 and being provided with an annular cut away portion 13 coöperating with the tubular member 10. This base may be of hard wood or of rubber. Within the bore 14 of the base I mount a glass tube 15 which may have a rounded end portion 16, the opposite end of the tube being closed by means of a suitable stopper of cork or other material designated 18 and sealed with wax shown at 19.

The tube 16 is filled with liquid of a suitable specific gravity as shown at 21 and a bar magnet 22 is surrounded by a covering of any suitable material of light weight and coated with varnish to prevent the absorption of the liquid. This covering or jacket is shown at 24 and extends to a point slightly distant from the opposite poles of the magnet. It is the intention that the magnet and its jacket 24 shall displace an approximately corresponding weight of the liquid, so that there will be very little friction between the jacket and the glass tube, affording a maximum degree of sensitiveness.

The north pole of the magnet being toward the curved end thereof, or the right hand end as shown in the drawings, the direction of movement of the floating magnet when placed in a magnetic field will indicate the sign of the adjacent magnetic pole, in the manner well understood.

What is claimed is:

1. In a device of the class described, a tubular member containing liquid, means for mounting said member, a bar magnet inclosed within the tubular member, and a jacket for the magnet comprising a body of buoyant material.

2. In a device of the class described, a tubular member closed at one end, detachable means for closing the opposite end thereof, said tubular member containing liquid, a bar magnet and a jacket surrounding said magnet and having its ends spaced from the poles of the magnet, said jacket being of buoyant material.

3. In a device of the class described, a tubular member of transparent material, a base portion for mounting said member, a casing adapted to surround said member and having connection with the base, a bar magnet within the transparent member, and a jacket of buoyant material carried by the magnet.

4. In a device of the class described, a tubular member of transparent material containing a liquid, a bar magnet inclosed thereby, a jacket of buoyant material carried by the bar magnet and having a length slightly less than that of the magnet, and means for mounting the transparent member.

In testimony whereof I affix my signature.

HENRY D. OAKLEY.